United States Patent [19]

Bronstert

[11] Patent Number: 4,988,773

[45] Date of Patent: Jan. 29, 1991

[54] HOMOPOLYMERS OR BLOCK COPOLYMERS OF VINYLAROMATICS AND/OR DIENES WITH AMMONIUM GROUPS, AND PREPARATION OF SAME

[75] Inventor: Klaus Bronstert, Carlsberg, Fed. Rep. of Germany

[73] Assignee: BASF Aktiengesellschaft, Ludwigshafen, Fed. Rep. of Germany

[21] Appl. No.: 437,783

[22] Filed: Nov. 21, 1989

Related U.S. Application Data

[63] Continuation of Ser. No. 46,146, May 5, 1987, abandoned.

[51] Int. Cl.$^5$ .................................................. C08F 8/32
[52] U.S. Cl. ............................... 525/332.9; 525/333.1; 525/333.2; 525/340; 525/344; 525/355; 525/360; 525/382
[58] Field of Search ................ 525/332.9, 333.1, 333.2

[56] References Cited

U.S. PATENT DOCUMENTS

| 3,113,986 | 12/1963 | Breslow et al. | 260/683.9 |
| 3,824,148 | 7/1974 | Lopatin | 161/188 |
| 3,931,126 | 1/1976 | Naylor | 525/382 |
| 4,269,626 | 5/1981 | Gorke et al. | 525/382 |
| 4,481,337 | 11/1984 | Burlett et al. | 525/340 |

FOREIGN PATENT DOCUMENTS 0211395 2/1987 European Pat. Off. .
2138005 10/1984 United Kingdom .

Primary Examiner—Bernard Lipman
Attorney, Agent, or Firm—Keil & Weinkauf

[57] ABSTRACT

Homopolymers or block copolymers of vinylaromatics and/or dienes and hydrogenated derivatives thereof, which contain end groups of the general formula (I):

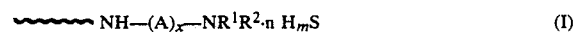

$\quad$ NH—(A)$_x$—NR$^1$R$^2$·n H$_m$S $\qquad$ (I)

where A is a substituted or unsubstituted bridge which, in addition to carbon, may contain nitrogen or oxygen, X is 0 or 1, S is an inorganic or organic acid radical, n is an integer from 1 to 12 and indicates the number of moles of acid used per chain end, R$^1$ and R$^2$ are each hydrogen, aliphatic or aromatic radicals or a bridge of 3 to 12 carbon members which may be substituted by aliphatic or aromatic radicals, and m is the number of hydrogen ions of the acid used, are prepared from polymers having amino end groups of the general formula (II):

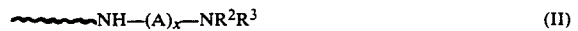

$\quad$ NH—(A)$_x$—NR$^2$R$^3$ $\qquad$ (II)

where R$^1$, R$^2$, A and x are as defined above, by reaction with from 1 to 12 moles of an inorganic or organic acid and used as molding materials for modifying thermoplastic materials or vulcanizable materials and as adhesives.

8 Claims, No Drawings

HOMOPOLYMERS OR BLOCK COPOLYMERS OF VINYLAROMATICS AND/OR DIENES WITH AMMONIUM GROUPS, AND PREPARATION OF SAME

This application is a continuation of application Ser. No. 046,146, filed on May 5, 1987 now abandoned.

The present invention relates to homopolymers or block copolymers of vinylaromatics and/or dienes and hydrogenated derivatives thereof, which contain end groups based on polybasic amines or on hydrazines, which are converted into cationic end groups with inorganic or organic acids.

It is known to prepare polybutadiene-based quaternary ammonium polymer compositions of high molecular weight which contain in the polymer chain a plurality of recurring quaternary ammonium units (cf. DE-A-No. 2,042,128). Polymers on the basis of butadiene-styrene copolymers where ammonium groups are randomly distributed in the macromolecule are also known (cf. EP-A-No. 100,590, U.S. Pat. Nos. 3,824,148 or 4,481,337).

However, existing polymers with ammonium groups contain only alkylammonium or arylammonium groups and not a plurality of adjacent ammonium group$ in side chains, preferably at chain ends.

It is an object of the present invention to modify a molding material composed of a homopolymer of a vinylaromatic or diene such as polystyrene or polybutadiene or a block copolymer of a vinylaromatic and a conjugated diene and a hydrogenated derivative thereof in such a way that, for the same molecular weight, distinctly better mechanical properties than in the corresponding unmodified polymer result.

We have found that this object is achieved with a polymer of the present invention and with the process described for preparing the polymer.

For the purposes of the present invention, the term homopolymer of a vinylaromatic covers in particular polymers of styrene and of ring-alkylated derivatives thereof, of o-methylstyrene or of other, more rarely used vinylaromatics such as vinylnaphthalene. Polymers of this type are so familiar from theory and practice that no details are required here (cf. Ullmann's Encyclopädie der technischen Chemie, 4th edition, Volume 19, pages 265 to 295, Verlag Chemie GmbH, 1980). Usually the weight average molecular weights Mw of customary styrene polymers range from 1500 to 2,000,000, in particular from 150,000 to 300,000.

Block copolymers of vinylaromatics and conjugated dienes are likewise very familiar from the literature (cf. Ullmann's Encyclopädie der technischen Chemie, 4th edition, Volume 13, pages 605 to 609, Verlag Chemie GmbH, 1977). Preferred dienes are butadiene, 2,3-dimethylbutadiene, pentadi-1,3-ene or isoprene, and the molecular weights are comparable to those of polystyrene, the weight average molecular weights $M_w$ ranging from 20,000 to 800,000. Homopolymers of dienes such as butadiene, isoprene, 2,3-dimethylbutadiene etc. can likewise be presupposed as known (cf. Ullmann's Encyclopädie der technischen Chemie, 4th edition, Volume 13, pages 602 to 604 and 617 to 619, Verlag Chemie GmbH, 1977). The molecular weights $M_w$ of customary polybutadienes range from 200,000 to 400,000 and of customary polyisoprenes from 1,000,000 to 2,500,000.

Hydrogenated derivatives and the preparation of these products by hydrogenation with molecular hydrogen in the presence of catalysts based on metals or metal salts of group 8 of the periodic table of the elements, either in homogeneous or in heterogeneous phase, are described in U.S. Pat. No. 3,113,986, DE-C-No. 2,414,872, DE-A-Nos. 2,013,263, 3,106,959, 2,027,841 or 1,595,345.

Preferred polymers are two-block copolymers of styrene and a diene with a diene content of more than 30% by weight, homopolydienes having molecular weights of from 60,000 to 400,000 and two- or three-block styrene/diene copolymers with diene contents of from 10 to 30% by weight, if desired in completely or partially hydrogenated form.

According to the invention, the polymers contain end groups of the general formula (I):

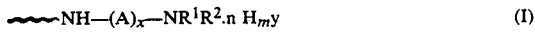

$$\text{\textasciitilde\textasciitilde\textasciitilde NH—(A)}_x\text{—NR}^1\text{R}^2\text{.n H}_m\text{y} \qquad (I)$$

where A is a substituted or unsubstituted bridge which, in addition to carbon, may contain nitrogen or oxygen, X is 0 or 1, Y is an inorganic or organic acid radical, n is an integer from 1 to 12 and indicates the number of moles of acid used per chain end, $R^1$ and $R^2$ are each hydrogen, aliphatic or aromatic radicals or a bridge of 3 to 12 carbon members which may be substituted by aliphatic or aromatic radicals, and m is the number of hydrogen ions of the acid used.

Preferably more than 50 mol % of the polymer molecules contain end group (I). Preferably $R^2$ is in each case hydrogen, $C_1$–$C_4$-alkyl and/or phenyl or a bridge composed of three or four carbon members which may be substituted by phenyl or $C_1$–$C_4$-alkyl. Preference is also given to polymers where the bridge A is substituted or unsubstituted polymethylene of 2 to 12 $CH_2$, cycloaliphatic or phenylene and where the bridge A contains methyl, ethyl, phenyl or alkylideneamino as substituents.

Particular preference is given to polymers which contain the end groups

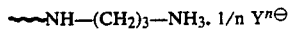

$$\text{\textasciitilde\textasciitilde\textasciitilde NH—(CH}_2\text{)}_3\text{—NH}_3 \cdot 1/n \; Y^{n\ominus}$$

$$\text{\textasciitilde\textasciitilde\textasciitilde NH}_2(\text{CH}_2)_2\text{N(CH}_3)_3 \cdot 2/n \; Y^{n\ominus} \text{ or}$$

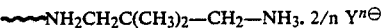

$$\text{\textasciitilde\textasciitilde\textasciitilde NH}_2\text{CH}_2\text{C(CH}_3)_2\text{—CH}_2\text{—NH}_3 \cdot 2/n \; Y^{n\ominus}$$

The starting polymers with diamine end groups which are required according to the invention can be prepared, for example, as described in U.S. patent application Ser. No. 889,372 or Macromol. Chem. Rapid Commun. 3 (1982), pages 59 to 63 by reacting living anionic or alkali-metallized homopolymers, copolymers and/or block copolymers of vinylaromatics and/or dienes with, for example, bicyclic diaziridines or difunctional Schiff's bases or hydrazones and then hydrolyzing and if desired hydrogenating the products. The polymers have the formula:

$$\text{\textasciitilde\textasciitilde\textasciitilde NH—(A)}_x\text{—NR}^1\text{R}^2 \qquad (II)$$

where A, $R^1$, $R^2$ and x are as defined at the beginning.

The preparation of the starting polymers required for the invention is described in detail in the references mentioned. Suitable vinylaromatics are in particular styrene and ring-alkylated derivatives thereof, as well as α-methylstyrene, but also other, more rarely used vinylaromatics. Suitable dienes are in particular butadiene, isoprene, 2,3-dimethylbutadiene and pentadi-1,3-ene.

To obtain a particularly useful effect according to the invention, preferably more than 50 mol %, in particular from 60 to 100 mol %, of the polymer molecules should carry terminal basic nitrogen groups of the type described above. Only those polymer ends are suitable which each contain two or more basic nitrogen atoms and are of the formula described above.

Suitable counterions for the formation of the ammonium salts are all conceivable inorganic and organic acids, provided they are sufficiently dissociable. In the case of polybasic acids, even acids of medium strength exhibit a very powerful action within the meaning of the invention. In addition, incompatibility of the acids with the apolar portion of the polymers is of advantage. The following, incomplete list gives examples of suitable acids: HCl, HBr, HI, $HClO_4$, $HBrO_4$, $H_2SO_4$, $H_2SO_3$, $H_3PO_4$, $H_4P_2O_7$, polyphosphoric acids, $H_3PO_3$, $H_2SeO_4$, $H_3AsO_4$. On the other hand, carbonic acid, silicic acid and other weak acids are less suitable. Strongly oxidizing acids such as $HNO_3$, $HClO_3$, $HClO_2$ etc. are likewise less suitable. Suitable organic acids are monocarboxylic and polycarboxylic acids, of which in particular polybasic acids and those having high constants of dissociation are suitable here. Examples are: oxalic acid, succinic acid, maleic acid, citric acid, tartaric acid, ascorbic acid, benzoic acid, isophthalic acid, terephthalic acid, trimesic acid, monosulfonic and polysulfonic acids and carbonsulfonic acids of aromatics and aliphatics, e.g. benzenesulfonic, toluenesulfonic and naphthalenesulfonic acids, polysulfonic acids of mononuclear and polynuclear aromatics, $\beta$-sulfopropionic acid, sulfobenzoic acids, phosphonic acids and the like, as well as uric acid, trifluoroacetic acid, mono-, di- and tri- chloroacetic acid, trifluoromethanesulfonic acid etc., and also acrylic acid, methacrylic acid, and so on. Also suitable are, furthermore, carboxyl- or sulfo-containing polymers such as polyvinylsulfonic acid, polyacrylic acid, polymethacrylic acid and copolymers of these acids and of maleic acid and fumaric acid with one another and with other comonomers. Acetic acid and other weak aliphatic monocarboxylic acids are less suitable. Not less than 0.7 mole of acid is used per mole of amine end groups present in the polymers. In the case of smaller amounts, the modified properties are not fully developed due to ionization of the polymers. Surprisingly, however, the polymers take up far larger amounts of acid, without phase separation, than is required for equivalence. For instance, the 3- and 5-basic acids of phosphorus are completely incompatible with polystyrene and polybutadiene; nonetheless, the polymers according to the invention take up large amounts of acid without forming a separate phase.

The additional amounts of acid taken up beyond the equivalence point lead to a reinforcement of the aggregation of the cationic chain ends until, eventually, when the excess amounts to several times the equivalence point, the improvement in properties levels off. It is therefore in general not useful to use an excess which is over six times the amount required for equivalence.

The acids are bonded surprisingly well to the polymers even if present in great excess. For instance, the acid content is hardly changed by precipitating the polymers from their solutions using alcohols or by washing the polymer solutions in hydrocarbons with water. The cationization of the end groups is only reversed by adding an alkali metal hydroxide or amine.

The acids can be added for example to the solution of the polymers before the latter are worked up, for example in the form of their concentrated aqueous solutions or in tetrahydrofuran. Sparingly soluble acids can also be incorporated in the form of their suspensions in hydrocarbons. This form of addition is particularly suitable for many organic acids, such as terephthalic acid, trimesic acid, oxalic acid, fumaric acid and others. It is expedient in this case first to prepare a finely divided suspension of the acids, for example by ballmilling the acid with a hydrocarbon or using an Ultraturrax.

The acids can also be mixed in after isolation of the polymers. Mixing into the polymer melt can be effected for example in an extruder or in a kneader, which may be accompanied by partial formation of acid amides. The conditions have to be chosen so as to produce optimal combinations of properties. The products produced by partial amide formation likewise form part of the subjectmatter of this invention. To prevent decomposition of the polymers and corrosion of the processing equipment it can be expedient first to dilute or suspend the acids in suitable polymers.

If the formation of amide groups is to be avoided, for example in the processing of molding materials at high temperatures, strongly dissociating acids will be particularly suitable, for example HCl, $HClO_4$, trifluoromethanesulfonic acid, to name but a few.

In place of the free acids it is also possible to add their ammonium salts in very concentrated solution in water, tetrahydrofuran or some other suitable solvent. In this case, the freed ammonia must be driven off, for example by evaporating some of the solvent. This type of addition is particularly gentle.

In place of free acids or ammonium salts thereof it is also possible, albeit less preferable, to effect the cationization of the amine end groups with alkylating agents, for example with dimethyl sulfate, methyl iodide, toluenemethylsulfonate, benzyl chloride, alkyl chloride and the like. In this case, however, a prolonged reaction time at elevated temperatures and a large excess of alkylating agent may be necessary to complete the reaction.

In place of an acid it is of course also possible to use a mixture of various acids for cationizing the polymers. We have found, for instance, that using $SO_2$ gives particularly bright reaction products, although how exactly the $SO_2$ acts is not clearly understood. It is assumed that the $SO_2$ forms an adduct with the aldehydes or ketones present from the synthesis of the polymers to give an $\alpha$-oxysulfonic acid, or a condensation product thereof, which interacts with the amino groups.

Sulfur dioxide is not the only additive we have found to have a brightening effect on the color. For instance, urea and derivatives thereof, provided they still contain at least one free hydrogen, exhibit a powerful action. Other highly suitable additives with this action are small amounts of alkylaluminums, aluminum hydrides or boron hydride.

The cationization of the amine end groups, although accounting in terms of weight for only a small proportion of the total molecule, brings about a pronounced change in the physical properties. We assume that this is due to an aggregation of the cationic chain ends. Thus we have observed, inter alia:
- an increase in the solution viscosity, which, depending on the amount of acid added, rises to a value which corresponds to almost six times the molecular weight of the unionized starting polymer.
- that polymers which carry cationic charges at both chain ends form a gel even at low concentrations,

- this phenomenon being particularly pronounced in apolar solvents.
- that polydienes having one or, better still, two cationic chain ends exhibit much reduced cold flow, if any, a property of rubber which is important for the handling of unvulcanized raw material.
- that two-block copolymers of the type polystyrene ->polydiene ->cationic end group with a predominant diene content are similar in their properties to threeblock copolymers of the styrene/diene/styrene type, but are easier to process than the latter.
- that molding materials made of polystyrene or predominant amounts of polyvinylbenzene with short diene blocks have a distinctly higher level of mechanical properties compared with unmodified polymers of the same composition and the same molecular weight.

All the polymers according to the invention exhibit a remarkably high adhesion to most metallic, polar and apolar surfaces, and for that reason are suitable for use as adhesives or adhesion promoters in solution or substance.

This list of the advantages of polymers which have been modified with cationic end groups is not comprehensive and is only intended to illustrate the advance in the art represented by the molding materials according to the invention.

The invention is illustrated by the following Examples. The starting polymers used were prepared in accordance with the following general recipe; all the percentages are by weight:

The reactor used was a 10 l glass flask equipped with a heating or cooling jacket, a stirrer, a reflux condenser operated with brine at $-30°$ C, a calibrated dropping funnel also with reflux condenser, a rubber cap sealed port and a pure nitrogen purge. The nitrogen is freed from traces of moisture and oxygen by washing with a mixture of 2% by weight of lithiumbutyl (sec.-butyllithium) in a white oil. The flask is first boiled out with a solution of lithiumbutyl in cyclohexane to which a little styrene has been added. The orange color of the solution which serves as an indicator of activity must be present to the end. The solution is drawn off, and the kettle is charged with cyclohexane which has previously been purified by passing through a column containing a molecular sieve. The amount is apportioned in such a way that at the end a solution having a solids content of 20% by weight is present. If styrene is to be polymerized, it should likewise be purified beforehand by means of a molecular sieve. The impurities still present thereafter are titrated out at 40° C. by injecting lithiumbutyl through the rubber cap with a calibrated syringe until a faint orange color appears. Immediately thereafter the calculated amount of lithiumbutyl required for the polymerization is added, and the styrene is polymerized to completion. The other monomers are then added in the proposed order and polymerized to completion with cooling at a temperature which does not exceed 70° C. The temperature is then reduced to 40°-45° C., and the polymerization i$ discontinued, to effect introduction of the terminal amino groups, by injecting a diaziridine or a Schiff's base in an amount of 110% by weight of theory by means of a calibrated syringe. After an hour, the desired acid is added with thorough stirring, if desired a little at a time. The polymer is precipitated by stirring the polymer solution into 4 times the volume of ethanol, and the polymer is kneaded out by hand (rubber gloves!) with an alcohol to which 0.5% by weight of ditertiary butyl p-cresol have been added as a stabilizer and dried overnight at 80° C. and 2 mb in a vacuum drying cabinet.

If no styrene is required for the polymer, the titration with lithiumbutyl is dispensed with and the molecular weight is determined by empirical tests. In general, the amount of lithiumbutyl required for destroying the impurities should not exceed 10% by weight of the amount required for the polymerization.

The polymers were characterized by the following analytical methods:

To determine the molecular weight, the modification with diaziridine is preceded by using a syringe to remove a sample from the reactor, precipitating with alcohol and drying under reduced pressure. A solution in tetrahydrofuran is subjected to gel permeation chromatography (GPC) using an instrument from Waters, equipped with UV and refractive index detectors, to determine the molecular weight distribution. The molecular weight (MW) is read off on calibration curves which have been produced with narrowly distributed standard polymers. In the case of block copolymers, the MW is based empirically on the average composition between the calibration curves of the two homopolymers. GPC measurement on the modified polymers is not possible owing to the polar end group. Total nitrogen was determined by Kjeldahl, and base nitrogen by potentiometric titration of the solution of the polymers in dichlorobenzene/glacial acetic acid with 0.1N perchloric acid.

The viscosity number (VN) was determined at 25° C. in toluene (0.5 g of polymer in 120 cm3 of toluene) in accordance with DIN 51,562.

The mechanical data (tensile strength at 300% extension, break strength and break elongation) were determined on test blanks 2.5 mm in thickness, which, in accordance with DIN 53,455, were cut from sheets held between Teflon disks.

EXAMPLES 1 TO 16

In the following Examples, narrowly distributed block copolymers with the Structure polystyrene - polybutadiene —NH—(CH2)3—NH2 - prepared by terminating the anionic living polymers with 1,5-diazabicyclo[3.1.0]-hexane and having the stated molecular weights, determined by gel permeation chromatography (GPC), and compositions were used. In solution in cyclohexane they were treated with the amounts of various acids stated in the Tables, precipitated with alcohol, dried at 50° C. and 2 mbar for 24 hours and analyzed. In addition to the data shown in the Tables, the polymers of Examples 5, 10, 11 and 15 were tested for adhesion promoter activity by pressing aluminum foils 0.05 mm in thickness at 150° C. in a press with the polymers mentioned in such a way as to produce a composite layer from 0.05 to 0.2 mm in thickness. The two aluminum foils were mechanically no longer separable from each other, they tended to break before the adhesive bond.

| Example No. | Polymer composition in wt. % | MW | Additions (mol/mol of polymer) Acid | Amount | Other | Amount | VN | Tensile strength 300% N/mm² | Break elongation % | Break strength N/mm² |
|---|---|---|---|---|---|---|---|---|---|---|
| Comparison 1 | 17% PS—83% PBu —NH(CH$_2$)$_3$NH$_2$ | 60000 | — | — | — | — | 78 | — | — | — |
| 1 | 17% PS—83% PBu —NH(CH$_2$)$_3$NH$_2$ | " | HCl | 1 | — | — | 94 | 0.67 | 734 | 0.99 |
| 2 | 17% PS—83% PBu —NH(CH$_2$)$_3$NH$_2$ | " | HCl | 1.5 | — | — | 108 | 1.19 | 526 | 2.31 |
| 3 | 17% PS—83% PBu —NH(CH$_2$)$_3$NH$_2$ | " | HCl | 2 | — | — | 138 | 1.30 | 719 | 3.15 |
| 4 | 17% PS—83% PBu —NH(CH$_2$)$_3$NH$_2$ | " | o-sulfobenzoic acid | 1 | — | — | 134.5 | 1.22 | 1048 | 3.58 |
| 5 | 17% PS—83% PBu —NH(CH$_2$)$_3$NH$_2$ | " | oxalic acid | 4 | — | — | 127 | 1.14 | 588 | 1.88 |
| 6 | 17% PB—83% PBu —NH(CH$_2$)$_3$NH$_2$ | " | — | — | dimethyl sulfate | 2 | 104 | 0.7 | 872 | 1.60 |
| Comparison 7 | 17% PS—83% PBu —NH(CH$_2$)$_3$NH$_2$ | 65000 | — | — | — | — | 80.2 | — | — | — |
| 7 | 17% PS—83% PBu —NH(CH$_2$)$_3$NH$_2$ | " | H$_3$PO$_4$ | 1 | — | — | 97 | 0.4 | 653 | 0.43 |
| 8 | 17% PS—83% PBu —NH(CH$_2$)$_3$NH$_2$ | " | " | 2 | — | — | 137 | 1.14 | 821 | 1.38 |
| 9 | 17% PS—83% PBu —NH(CH$_2$)$_3$NH$_2$ | " | " | 3 | — | — | 159 | 1.46 | 430 | 1.53 |
| 10 | 17% PS—83% PBu —NH(CH$_2$)$_3$NH$_2$ | " | " | 4 | — | — | 178 | 1.68 | 368 | 1.88 |
| 11 | 17% PS—83% PBu —NH(CH$_2$)$_3$NH$_2$ | " | trimesic acid | 1 | | | 178 | 1.05 | 902 | 2.92 |
| Comparison 12 | 9% PS—91% PBu —NH(CH$_2$)$_3$NH$_2$ | 80000 | — | — | — | — | 105 | — | — | — |
| 12 | 9% PS—91% PBu —NH(CH$_2$)$_3$NH$_2$ | " | — | — | Al(Et)$_3$ ethyleneurea | 0.05 0.5 | 109 | — | — | — |
| 13 | 9% PS—91% PBu —NH(CH$_2$)$_3$NH$_2$ | " | oxalic acid | 2 | Al(Et)$_3$ ethyleneurea | 0.05 0.5 | 184 | 0.89 | 837 | 1.09 |
| 14 | 9% PS—91% PBu —NH(CH$_2$)$_3$NH$_2$ | " | H$_3$PO$_3$ | 4 | Al(Et)$_3$ ethyleneurea | 0.05 0.5 | 182 | — | 286 | 0.80 |
| Comparison 15 | 9% PS—91% PBu —NH(CH$_2$)$_3$NH$_2$ | " | — | — | — | — | 103.4 | — | — | — |
| 15 | 9% PS—91% PBu —NH(CH$_2$)$_3$NH$_2$ | " | oxalic acid | 2 | ethyleneurea SO$_2$ Al(Et)$_3$ | 0.5 2 0.05 | 227 | 1.22 | 1110 | 3.22 |
| 16 | 9% PS—91% PBu —NH(CH$_2$)$_3$NH$_2$ | " | H$_3$PO$_4$ | 4 | ethyleneurea SO$_2$ Al(Et)$_e$ | 0.5 2 0.05 | 224 | 1.26 | 1088 | 3.35 |

PS = polystyrene
PBu = polybutadiene
VN = viscosity number

EXAMPLE 17

Preparation of a polybutadiene with cationic end group

A 5 l stainless steel kettle was charged under nitrogen with three liters of purified and dried cyclohexane and then with 500 g of butadiene which had been purified by distillation over lithiumbutyl. The mixture was heated to 40° C., and the polymerization was initiated by adding 6.3 mmol of lithiumbutyl. After polymerization at 65° to 70° C. for 3 hours the reaction mixture was cooled down to 40° C. and a sample was removed. GPC showed an MW of 83,000. 7 mmol of 1,5-diazabicyclo[3.1.0]-hexane

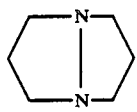

were then added to attach a 1,3-diaminopropyl end group to the polymer molecule. After an hour a sample was removed. Kjehldahl determination of the nitrogen content produced a value of 0.035% by weight (theory 0.034% by weight for MW 83000). 3.5 mmol of ethyleneurea, 7 mmol of SO$_2$ and 7 mmol of oxalic acid, dissolved in tetrahydrofuran, were then added in succession to one half of the batch, and the polymer was precipitated by pouring into ethanol. The other half of the batch was precipitated without additions. The two products were kneaded with fresh ethanol and dried at 80° C. under reduced pressure.

The cold flow of the two rubber samples, which differed only in respect of the additives, was compared in the following experiment:

The two polymers were formed into balls of 20 g each, which were placed on glass plates. The increasing area covered by the balls as they flowed in all directions was determined against time at room temperature.

| Time min. | Area (cm²) of comparative rubber | Area (cm²) of cationized rubber |
| --- | --- | --- |
| 0 | 8 | 7 |
| 15 | 20 | 7.5 |
| 60 | 22 | 8 |
| 300 | 44 | 11 |
| 1440 | 62 | 15 |
| 5760 | 71 | 17 |

EXAMPLES 18 TO 20

In the following Examples, the preparation of clear impact-resistant block copolymers having cationic end groups and a butadiene content of (a) 25% by weight (Example 18), (b) 15% by weight (Example 19) and (c) 10% by weight (Example 20) is described. The respective amounts of reactants are correspondingly characterized.

A 10 l kettle was charged with 5390 cm³ of cyclohexane and (a) 642 g, (b) 733 g or (c) 775 g of styrene, and, at 40° C., the mixture was titrated under inert gas with a 1.5% by weight strength butyllithium solution until a faint orange color appeared. 3.6 mmol of butyllithium were then added in the form of a molar solution in hexane, and polymerized to completion at 60° C. in the course of one hour. A further (a) 18 mmol of butyllithium were added to the solutions, followed by (a) 389 g, (b) 448 g or (c) 474 g of styrene, and polymerized. A mixture of (a) 214 g of styrene and 426 g of butadiene, (b) 245 g of styrene and 252 g of butadiene or (c) 260 g of styrene and 168 g of butadiene was then added and again polymerized at 60°-70° C. to completion. The viscosity number in toluene was (a) 82, (b) 72 or (c) 71. After cooling down to 40° C., (a) 2 g of 1,5-diazabicyclo[3.1.0]hexane were added. After an hour 1.02 g of ethyleneurea were added in each case, followed by a mixture, dissolved in tetrahydrofuran, of 2.6 mmol of SO₂, 13.5 mmol of phosphoric acid and 40.5 mmol of oxalic acid. The block copolymers were precipitated by stirring into 20 l of methanol with thorough stirring and dried under reduced pressure. The properties are revealed in the Table below.

I claim:

1. A salt of a homopolymer or block copolymer of a vinylaromatic and/or a diene which contains end groups of the formula: [∼—NH—(A)$_x$—NR¹R² .H$_m$Y]NHl13 A—NR¹R² where A is a substituted or unsubstituted methylene bridge of 1 to 12 CH₂ groups, a cycloaliphatic bridge or a phenylene bridge, R¹ and R² are each hydrogen, aliphatic or aromatic radicals or a bridge of 3 to 12 carbon members which may be substituted by aliphatic or aromatic radicals, as obtained by anionic polymerization of vinylaromatic and/or diene monomers, reacting the so obtained alkali-metallized (living) polymer with an amine providing the structure, —NH—A—NR¹R², hydrolyzing, and reacting with an acid selected from the group consisting of HCl, HBr, HI, HClO₄, HBrO₄, H₂SO₄, H₂SO₃, H₃PO₄, H₄P₂O₇, polyphosphoric acids, H₃PO₃, H₂SeO₄, and H₃AsO₄.

2. The polymer of claim 1, wherein more than 50 mol % of the polymer molecules contain end groups (I).

3. The polymer of claim 1, wherein bridge A contains methyl, ethyl, phenyl or alkyldeneamino as substituents.

4. The polymer of claim 1, wherein R¹ and R² are each hydrogen, C₁-C₄-alkyl and/or phenyl or a bridge which is composed of three or four carbon members and may be substituted by phenyl or C₁-C₄-alkyl.

5. The polymer of claim 1, which contains the end groups

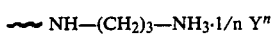

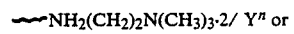

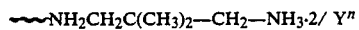

6. A molding material for modifying thermoplastic materials or vulcanizable materials, which contains a polymer as defined in claim 1.

7. An adhesive which contains a polymer as defined in claim 1.

8. The homopolymer or block copolymer of claim 1, wherein the end group is

and the acid is HCl.

* * * * *

| Example | Composition | | VN after polymer. cm³/g | VN of end product cm³/g | Tensile tests | | | Adhesive force kj/m² |
| --- | --- | --- | --- | --- | --- | --- | --- | --- |
| | wt. % of styrene | wt. % of butadiene | | | | | | |
| 18 | 75 | 25 | 82 | 96 | 20 | 24 | 360 | 60 |
| 19 | 85 | 15 | 77 | 88 | 33 | 26 | 270 | 25 |
| 20 | 90 | 10 | 71 | 83 | 40 | 27 | 55 | 8 |

Tensile tests: Column 1, tensile strength; column 2, break strength; column 3, break elongation

UNITED STATES PATENT AND TRADEMARK OFFICE
CERTIFICATE OF CORRECTION

PATENT NO.  : 4,988,773

DATED       : January 29, 1991

INVENTOR(S) : Klaus BRONSTERT

It is certified that error appears in the above-identified patent and that said Letters Patent is hereby corrected as shown below:

ON THE TITLE PAGE insert --Foreign Application Priority Data
            May 27, 1986...Fed. Rep. of Germany...3617785.7--

Claim 1, Line 4
Column 10, line 5,
delete "NH113" and insert -- $\sim$ --

UNITED STATES PATENT AND TRADEMARK OFFICE
CERTIFICATE OF CORRECTION

PATENT NO. : 4,988,773
DATED : January 29, 1991
INVENTOR(S) : Klaus BRONSTERT

It is certified that error appears in the above-identified patent and that said Letters Patent is hereby corrected as shown below:

<u>Claim 5</u>
Column 10, lines 29-33,
should read -- The polymer of claim 1, which contains the end groups

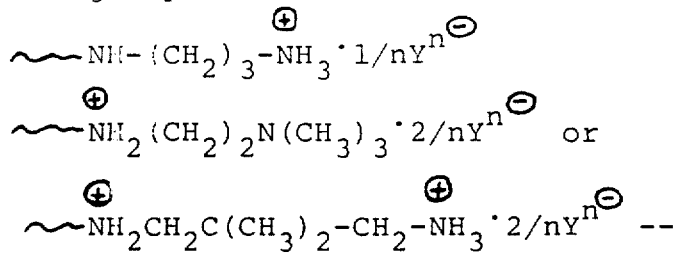

Signed and Sealed this

Twenty-eighth Day of July, 1992

Attest:

DOUGLAS B. COMER

Attesting Officer     Acting Commissioner of Patents and Trademarks